May 5, 1936. C. E. GARDNER 2,039,986
WATERING TUBE DEVICE FOR PACKAGED PLANTS, SHRUBS, ETC
Filed Sept. 28, 1935

Inventor
CLARK E. GARDNER

By

Attorney

Patented May 5, 1936

2,039,986

UNITED STATES PATENT OFFICE 2,039,986

WATERING TUBE DEVICE FOR PACKAGED PLANTS, SHRUBS, ETC.

Clark E. Gardner, Osage, Iowa

Application September 28, 1935, Serial No. 42,701

1 Claim. (Cl. 47—38)

The present invention relates to devices for watering or irrigating the roots of plant packages, and consists in the combinations and arrangements of elements hereinafter described and particularly set forth in the accompanying claim.

The purpose of the invention is to provide a simple device of this character which may be conveniently applied to or initially included with the wrapped or packaged root portion of a plant whereby water may be forcibly injected thereto in a simple and easy manner, and without wetting the exterior of the package or otherwise.

In the present manner of putting up various styles of packages for plants, shrubs, trees, cuttings and the like for selling in chain stores, department stores and other sources of distribution, the attractiveness of such plants and the disposal thereof to retail buyers is greatly hindered in that shortly after the same leave the nursery, the roots start to dry, the tops wilt and wither, all due to the fault that there is no means for irrigating the roots while the plants are on display, consequently the plants die or become unsalable and the loss incident to this is considerable. It is therefore the purpose of the present invention to avoid this disadvantage by providing each package with means for conveniently irrigating the roots at will so that the plant will be attractive, fresh, and otherwise salable at all times.

The disclosure herein is directed to a special application and form of the device which is used in connection with plant packages of the type in which the roots are potted or wrapped in burlap or other appropriate fabric, and with the stalks or stems of the plant of appreciable size, as distinct from the smaller type of plant package which forms a unitary or single article. In this latter instance the invention is likewise especially applicable and the particular means employed therein forms the basis of my co-pending application for U. S. Patent filed of even date herewith and entitled Plant package watering device, now Patent 2.033,627 dated March 10, 1936.

The invention as disclosed herein is especially serviceable for use with the types of plant packages disclosed in my U. S. Patents Nos. 1,493,152 and 1,606,523 dated May 6, 1924 and Nov. 9, 1926 respectively.

Figure 2:
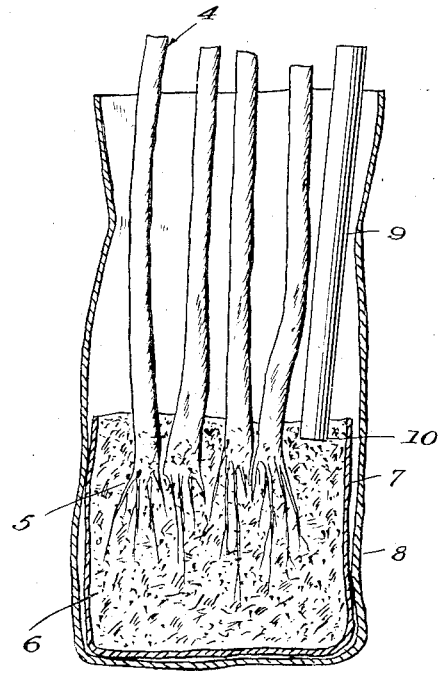
Figure 1:
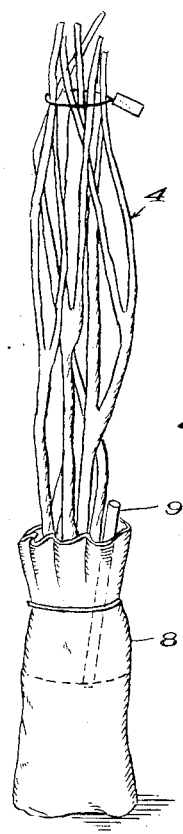
Figure 3:
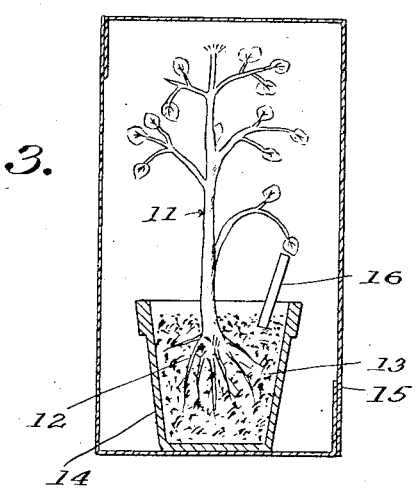

The invention is shown by way of illustration in the accompanying drawing wherein:

Figure 1 is a front elevational view showing the device applied to a plant package of the bundle type;

Figure 2 a central sectional view thereof, and;

Figure 3 a view showing the watering tube applied to the potted roots of a plant package that is wholly contained within a carton.

Referring to the construction in further detail and wherein like reference characters designate corresponding parts in the different figures shown the package consists of one or more growing plants 4, of substantial size, and whose roots 5 are embedded within soil, peat moss, or other appropriate material 6, and said roots with the soil are suitably enclosed within an inner container or wrapping 7 of burlap or other appropriate fabric. A parchment or bag like covering 8 enclose the whole substantially after the manner shown and in this the major portion of the stalks or stems 4 are exposed and adapted to be handled in the usual way.

The device for watering the roots 5 and surrounding material 6 comprises an open tube 9 whose lower end 10 is inserted an appreciable distance within the root enclosing material 6, as shown in Figure 2, and the upper end of the tube projects sufficiently above the enclosing or wrapper 8 to be clearly seen and available for its purpose at all times.

In the use of the device, i. e. for irrigating the plant roots, water may be readily inserted through the tube or pipe 9 by means of an ordinary oil can, medicine dropper, syringe, special hose nozzle, or in fact any device may be employed whereby water under suitable pressure may be injected into the tube as will be understood.

The tube or pipe 9 is obviously of that diameter required for watering a particular size of plant and package and for the tube material ordinary drinking straws may be used. Also hollowed reeds or pipe made of rubber, glass, metal or in fact tubes of any material are serviceable. The tube is placed in the package in course of making and with its lower end fitted sufficiently deep into the top part of the soil. The roots of the package are then wrapped in waxed or other waterproof fabric, sheet rubber, burlap, etc., obviously depending upon the size and growing habits of the plant as will be understood.

In the application of the invention as shown in Figure 3 the plant 11 has its roots 12 and soil 13 in the pot 14 and the whole is contained within a carton 15 which completely houses the entire plant and packing as shown. In this instance the roots and packing of the plant may be irrigated at will through the tube 16 which is set sufficiently within the soil or the roots when the same is being potted.

It will further be understood the invention as herein disclosed is not limited to the details of construction shown and described, and that these may be varied widely without departing from the spirit of the invention as defined by the claim.

What is claimed as new is:

A plant package comprising a growing plant having its roots growing in soil and the stalks or stems thereof extending an appreciable distance beyond the soil, an inner container of pliable material holding the rooted soil, an outer or bag like container enclosing said pliable inner container and an appreciable portion of the stalks or stems, and an open ended tube lying substantially parallel with the stems of the plant and having its lower end penetrating the rooted soil for an appreciable distance for irrigating purposes; the whole being wrapped into a unitary structure and constituting a self contained parcel for commercial shipment, substantially as set forth.

CLARK E. GARDNER.